United States Patent [19]

Frydman et al.

[11] Patent Number: 4,469,600

[45] Date of Patent: Sep. 4, 1984

[54] PROCESS FOR BIOLOGICAL WASTEWATER TREATMENT

[75] Inventors: Allen Frydman; Hans Reimann, both of Munich, Fed. Rep. of Germany

[73] Assignee: Linde Aktiengesellschaft, Wiesbaden, Fed. Rep. of Germany

[21] Appl. No.: 493,489

[22] Filed: May 11, 1983

Related U.S. Application Data

[63] Continuation-in-part of Ser. No. 482,757, Apr. 7, 1983.

[30] Foreign Application Priority Data

Apr. 7, 1982 [DE] Fed. Rep. of Germany ....... 3213074

[51] Int. Cl.³ .............................................. C02F 3/04
[52] U.S. Cl. .................................... 210/610; 210/150; 210/617; 435/177; 435/180; 435/253
[58] Field of Search ................................ 210/616–618, 210/610, 150, 151, 601, 350, 351; 435/180, 182, 177, 174, 253, 179, 264; 427/244

[56] References Cited

U.S. PATENT DOCUMENTS

| | | | |
|---|---|---|---|
| 3,293,174 | 12/1966 | Robjohns | 210/617 |
| 4,055,490 | 10/1977 | Hasegawa et al. | 210/616 |
| 4,322,296 | 3/1982 | Fan et al. | 210/618 |
| 4,323,650 | 4/1982 | Rosevear | 435/182 |

FOREIGN PATENT DOCUMENTS

| | | | |
|---|---|---|---|
| 0046901 | 3/1982 | European Pat. Off. | 210/617 |
| 2841011 | 4/1980 | Fed. Rep. of Germany | 210/151 |
| 54-115547 | 9/1979 | Japan | 210/150 |

*Primary Examiner*—Benoit Castel
*Attorney, Agent, or Firm*—Millen & White

[57] ABSTRACT

For the biological purification of wastewater in a reactor in the presence of open-pore and compressible carrier material for biomass, the carrier material, prior to its use in the reactor, is loaded with bacteria, finely divided, inorganic and/or organic compounds, selected for wastewater purification, and is then either stored or used in the process, the loaded carrier being especially useful for decreasing the start-up time of a wastewater treatment plant.

10 Claims, 1 Drawing Figure

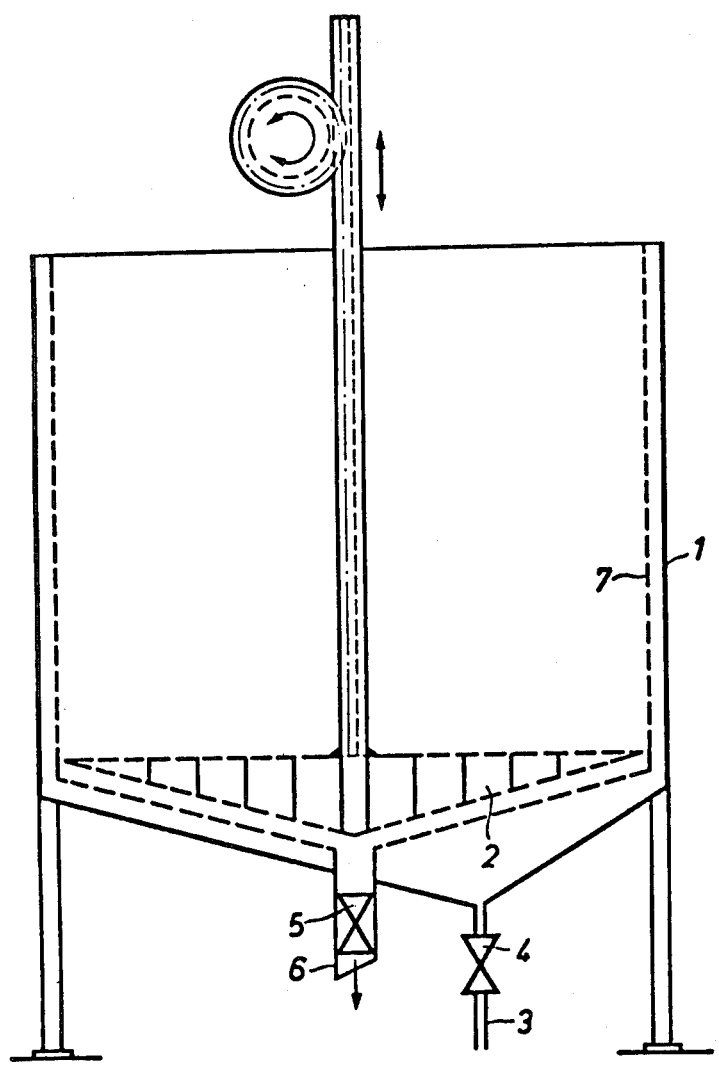

PROCESS FOR BIOLOGICAL WASTEWATER TREATMENT

CROSS-REFERENCE TO RELATED APPLICATION

This application is a continuation-in-part of application Ser. No. 482,757, filed Apr. 7, 1983.

BACKGROUND OF THE INVENTION

This invention relates to a process for the biological treatment of wastewater in a reactor in the presence of open-pore and compressible carrier material for biomass.

As is known, the principle of inoculation is frequently employed when starting-up wastewater treatment plants, in order to shorten the start-up phase. The wastewater treatment plant to be started-up is inoculated, as needed, with nitrifying bacteria (Nitrosomonas and Nitrobacter), anaerobic bacteria (anaerobes), or phosphate-degrading bacteria (Acinetobacter). For this purpose, activated sludge from an already operating plant is utilized, for example, which sludge contains the appropriate bacteria. However, due to the slow multiplication of the bacteria, the start-up phase can stretch over several weeks, and such a long start-up phase is especially to be avoided when using carrier material for biomass.

SUMMARY OF THE INVENTION

Therefore, an aspect of one object of the present invention is to provide a process of the above-described type so that the start-up phase for wastewater treatment plants with the use of carrier material is shortened in a simple and economical fashion.

The process comprises, according to the invention, loading the carrier material, before its use in the reactor, with bacteria, finely divided, inorganic and/or organic compounds, selected for wastewater purification, and optimally prior to use, storing the carrier material.

This invention is based on the discovery that carrier material which has been doped and/or loaded with bacteria and/or compounds is highly suitable for shortening the start-up phase of a wastewater treatment plant. By virtue of this invention, it is possible to shorten the start-up, from several weeks to few days, e.g. 5–8 days.

The doped carrier material is introduced into the reactor of the plant to be started-up, which reactor can be, for example, a circulating ditch, e.g., an oxidizing pond, an aeration tank, a fluidized-bed or fixed-bed reactor, and the bacteria incorporated into the carrier material can immediately begin the breakdown of matter and at the same time can further multiply. In this connection, it is also of special advantage that the doped carrier material need not be utilized immediately after loading with the bacteria and/or compounds, but rather is stored first. The advantage of storing is to have a supply a concentrated biomass at any time, for instance after a breakdown in a plant or for transport to another plant for starting. Storage includes a time at least as long as 3 months, preferably at least as long as 6–12 months.

Another advantage of the invention resides in that the carrier material can be loaded not only with appropriate bacteria, but also with finely divided, inorganic and/or organic compounds. Suitable inorganic compounds are, for example, activated carbon and aluminum oxide. In this connection, activated carbon, due to its large active surface area, acts as a well-proven adsorbent for microorganisms, for substances contained in the wastewater, and for oxygen; and aluminum oxide serves as an adsorbent for specific materials contained in the wastewater. Furthermore, silicic acid, rendered hydrophobic, i.e., silica gel can be incorporated into the carrier material as an adsorbent for fats and oils.

According to a further aspect of this invention, the loading of the carrier material is performed in the prresence of the selected bacteria and/or compounds, distributed in water, by compression of the carrier material to exhaust air therefrom, and the subsequent expansion of the carrier material with the simultaneous adsorption of water, together with the selected bacteria and/or compounds, into the interior of the carrier material to replace removed air.

Preferably, the carrier material is compressed to about 10–30% of its original volume. It proved to be especially advantageous to repeat compression and expansion of the carrier material several times.

Whereas any type of open-pore and compressible carrier can be used in this invention, preferred types are ether-based polyurethanes, foamed natural or synthetic rubber, reticulated polyurethanes or rubbers with particle size of about 5–50 mm and pore size of about 0.5–5 mm. The preferred biomass concentration in the carrier material is 10–50 g/l on a dry weight basis.

The process is conducted in an apparatus comprising a tank with a compression means, a charging device for the carrier material, connected to the tank, a feed conduit for the selected bacteria and/or compounds distributed in the water, as well as an outlet conduit for the loaded carrier material.

Especially when loading the carrier material with anaerobic bacteria, the tank is preferably of a sealed design, but preferably with means provided to remove air from the tank. Moreover, the compression means is especially advantageously designed to be a piston.

The invention can be utilized for starting-up any type of wastewater treatment plant. Moreover, the loaded carrier material can also be used for the rapid elimination of disturbances in a wastewater treatment plant, or basically for supporting the processes taking place in wastewater treatment plants.

Upon further study of the specification and appended claims, further objects and advantages of this invention will become apparent to those skilled in the art.

BRIEF DESCRIPTION OF FIGURE

The FIGURE is a schematically illustrated preferred embodiment of the invention.

DETAILED DESCRIPTION OF FIGURE

The FIGURE shows a tank 1 for loading carrier material, comprising a compression means 2 designed as a piston. The tank is filled, for example, to the halfway mark with an aqueous suspension containing the selected bacteria and/or compounds by way of a feed conduit 3 with valve 4. This suspension can be taken, for example, from any wastewater treatment plant in operation. Subsequently, valve 4 is closed and the carrier material is charged from the top. If the carrier material is to be loaded with anaerobic bacteria, the tank 1 is provided with a cover, not shown, comprising a sealable feed opening.

By lowering the piston 2, the flexible carrier material is compressed, preferably to 10–30% of its original volume, and simultaneously the air is squeezed out. During the subsequent lifting of the piston (expansion of the carrier material), the carrier material absorbs water, bacteria, finely divided, organic and/or inorganic compounds, which preferably settle in the interior of the carrier material. This process is preferably repeated several times, for example two to three times.

Thereafter, valve 4 is opened in order to discharge the residual, unabsorbed sludge of the suspension. By opening valve 5 in an outlet conduit 6, the loaded carrier material can then be withdrawn from tank 1.

It is advantageous to provide the carrier material in comminuted form, e.g., a particle size of 10-20 mm so that it can be readily charged into tank 1 and/or discharged via conduit 6. To prevent discharge of the carrier material via conduit 3 together with the residual sludge, the tank 1 is preferably equipped with a screen retaining plate 7 for the carrier material.

After removal from tank 1, the loaded and/or doped carrier material can either be utilized immediately in the reactor of the wastewater treatment plant, or it is also possible first to store the loaded carrier material and subsequently transport same to the respective usage site.

Without further elaboration, it is believed that one skilled in the art can, using the preceding description, utilize the present invention to its fullest extent. The following preferred specific embodiment is, therefore, to be construed as merely illustrative, and not limitative of the remainder of the disclosure in any way whatsoever. In the following example all temperatures are set forth uncorrected in degrees Celsius; unless otherwise indicated, all parts and percentages are by weight. A tank of 20 m$^3$ total volume is filled with 10 m$^3$ of surplus sludge from a nitrifying biological step. This sludge has been thickened before to 30 kg/m$^3$ solids. To this 250 kg polyurethane foam pieces of a means diameter of 20 mm are charged from the top of the tank. Then a piston with channels of 5 mm diameter is inserted and the foam is compressed by mechanical action in the sludge liquor. Air is pressed out of the foam and flows together with overstanding liquor through the channels and leaves the tank. After the piston has reached a deepest position, indicated for instance by a force meter, the piston is moved upwards whereby sludge liquor is forced into the foam particles. After once repeating this down and upward action, surplus liquor is discarded from the tank and then the loaded foam particles are withdrawn and are brought to a storage tank or are dried to a moisture content of 20-70% before storage.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the biological treatment of wastewater in a reactor in the presence of open-pore and compressible carrier material for biomass, the improvement comprising loading said open pore and compressible carrier material, prior to being used in the reactor, with bacteria, finely divided inorganic and/or organic compounds, selected for wastewater purification, with said loading being conducted in the presence of the selected bacteria and/or compounds distributed in water, by compressing and simultaneously removing air from said carrier and subsequently expanding said carrier to simultaneously absorb water, together with the selected bacteria and/or compounds, substantially into the open pores in the interior of the carrier material to replace removed air, and introducing resultant loaded carrier material into the reactor to start up the biological treatment of the wastewater, thereby shortening the start-up time to conduct the biological process substantially as compared to using a non-loaded carrier material.

2. A process according to claim 1, characterized in that the carrier material is compressed to about 10-30% of its original volume.

3. A process according to claim 1, wherein the compression and expansion of the carrier material is repeated several times.

4. A process according to claim 1, further comprising storing resultant loaded carrier prior to introducing the latter into the reactor.

5. A process according to claim 4, wherein the particles are dried to a moisture content of 20-70% before storage.

6. A process according to claim 1, wherein said carrier material is made of one of ether-based polyurethanes, foamed natural or synthetic rubber, reticulated polyurethanes or rubber.

7. A process according to claim 6, wherein the particles have a size of about 5-50 mm and a pore size of about 0.5-5 mm.

8. A process according to claim 7, wherein the particle size is about 10-20 mm.

9. A process according to claim 1, wherein the particles are loaded to a biomass concentration of 10-50 g/l on a dry weight basis.

10. A process according to claim 1, wherein said compounds are one of activated carbon, aluminum oxide or silicic acid used as adsorbents.

* * * * *